United States Patent [19]

Tominaga

[11] Patent Number: 5,144,908
[45] Date of Patent: Sep. 8, 1992

[54] CELL-FORMING ASSEMBLY FOR A HOUSEHOLD AQUARIUM

[75] Inventor: Kazutoshi Tominaga, Osaka, Japan

[73] Assignee: Kabushiki Kaisha Tominaga Jyushi Kogyosho, Osaka, Japan

[21] Appl. No.: 713,459

[22] Filed: Jun. 11, 1991

[51] Int. Cl.$^5$ .............................................. A01K 63/00
[52] U.S. Cl. ........................................................ 119/5
[58] Field of Search ................................. 119/3, 5, 15

[56] References Cited

U.S. PATENT DOCUMENTS

| | | | |
|---|---|---|---|
| 3,216,395 | 11/1965 | Girard | 119/5 |
| 3,288,110 | 11/1966 | Goldman et al. | 119/5 |
| 3,512,503 | 5/1970 | Willinger | 119/5 |
| 3,584,602 | 6/1971 | Stasio | 119/5 |
| 4,120,265 | 10/1978 | Davis | 119/5 |

*Primary Examiner*—John G. Weiss
*Attorney, Agent, or Firm*—Collard & Roe

[57] ABSTRACT

A cell-forming assembly for use with a household aquarium comprises a first section for forming cells to separate adult fishes and a second section which forms a space to rear fry and is detachably secured to and beneath the bottom of the first section. The first section comprises a main body having an open top and open front faces as well as a bottom plate, which bottom plate has a plurality of openings such as slits or holes. The first section further comprises fastening members for detachably attaching the main body to the aquarium, and partitions which are removably placed in the main body so as to divide an internal space thereof into cells. The second section is a box-like member having an open top face. The cells accommodate the tropical fishes such as guppy, platy, swordtail or betta separated from other aquarium fishes, and the slits of bottom plate allow the eggs or fry to enter the second section so as to be reared safely in this section.

4 Claims, 3 Drawing Sheets

CELL-FORMING ASSEMBLY FOR A HOUSEHOLD AQUARIUM

BACKGROUND OF THE INVENTION

The present invention relates to a cell-forming assembly which is equipped in a household aquarium so as to divide a part of its inner space into cells such that the tropical fishes such as "guppy", "platy", "swordtail" and "betta" are separated from other usual aquarium fishes accommodated in the same household aquarium, wherein the upbringing of eggs or fry (i.e., young of fishes) spawned by adult fishes in those cells is ensured.

Popular household aquariums which have been widely used comprise in general a transparent surrounding wall of glass or plastics and are of a box-like shape.

Such a household aquarium may be used to accommodate not only the same species of aquarium fishes but also in some cases different species thereof. Though there may be no problem in the former case, it has been observed that in the latter cases the different aquarium fishes often fight with one another to mutually hurt or occasionally devour one another. In particular, inoffensive aquarium fishes can hardly share the same aquarium space with the other fishes such as guppy, platy, swordtail and betta.

To resolve such a problem, it would be feasible to simply form a fixed untransparent cell or cells within a household aquarium so that various kinds of fishes can be accommodated in the same aquarium for watchers' enjoyment. Such an aquarium would not excite amusement because, in particular, the outstretched fins of the fighting fishes such as betta cannot be observed when they often frighten other fishes away to quarrel over their territories. They would not so behave, if they were separated by the simple cell from the other fishes within the same aquarium.

Besides, the viviparous fishes such as guppy, platy and swordtail are likely to eat their eggs or fry. It is therefore difficult to propagate the eggs or fry in one and the same aquarium.

SUMMARY OF THE INVENTION

Therefore, an object of the present invention is to provide a cell-forming assembly which is easily equipped in a household aquarium so as to divide a part of its inner space into cells.

Another object of the invention is to provide a cell-forming assembly which forms such cells that can safely accommodate the fighting fishes such as betta separated from other inoffensive fishes, wherein the natural behavior of the fighting fishes can be observed to arouse interest.

Still another object is to provide a cell-forming assembly which makes it possible to propagate the eggs or fry in one and the same aquarium.

Further objects will become apparent from the preferred embodiments, which are described hereinafter by way of example and referring to the accompanying drawings, but are not limitative of the scope of invention.

According to the invention, a cell-forming assembly for use in combination with a household aquarium comprises a first section for forming cells to separately accommodate adult fishes and a second section for forming another cell to rear such fry as may be spawned by the adult fishes, with the first section including a main body which is long sideways and has an open top and front faces. The main body comprises a rectangular back wall long sideways, a bottom plate extending forwards from the lower edge of the back wall and having a plurality of openings such as slits or holes, a pair of opposite side walls connected to both side edges of the back wall and bottom plate. The first section of the cell-forming assembly further comprises fastening members attached to the main body so as to detachably secure it to an aquarium wall so that the open front face of the main body may be disposed substantially in contact with the inner surface of aquarium wall. The first section still further comprises at least one partition detachably to be held inside the main body so that an internal space defined by the main body and aquarium wall is divided into a row of cells arranged from side to side. The second section for forming the cell to rear the fry is a box-like member having an open top and being elongate from side to side, with the open top being detachably secured to the bottom plate of the main body so as to be in contact therewith.

The fastening members which detachably secure the main body to the inner surface of aquarium may preferably be a pair of sucking discs which are provided at both sides of the front face of said main body.

The partitions, which define the cells to accommodate the fighting fishes so as not to irritate one another, may be deep-colored plastics plates, frosted glass plates having a ground or abraded surface, or the like. Instead of such translucent plates, any opaque plates may be used to perfectly prevent the fighting fishes from looking at other fishes.

BRIEF DESCRIPTION OF THE DRAWINGS

In the drawings illustrating a cell-forming assembly in the preferred embodiment of the present invention.

DETAILED DESCRIPTION OF PREFERRED EMBODIMENTS

Figure 1:
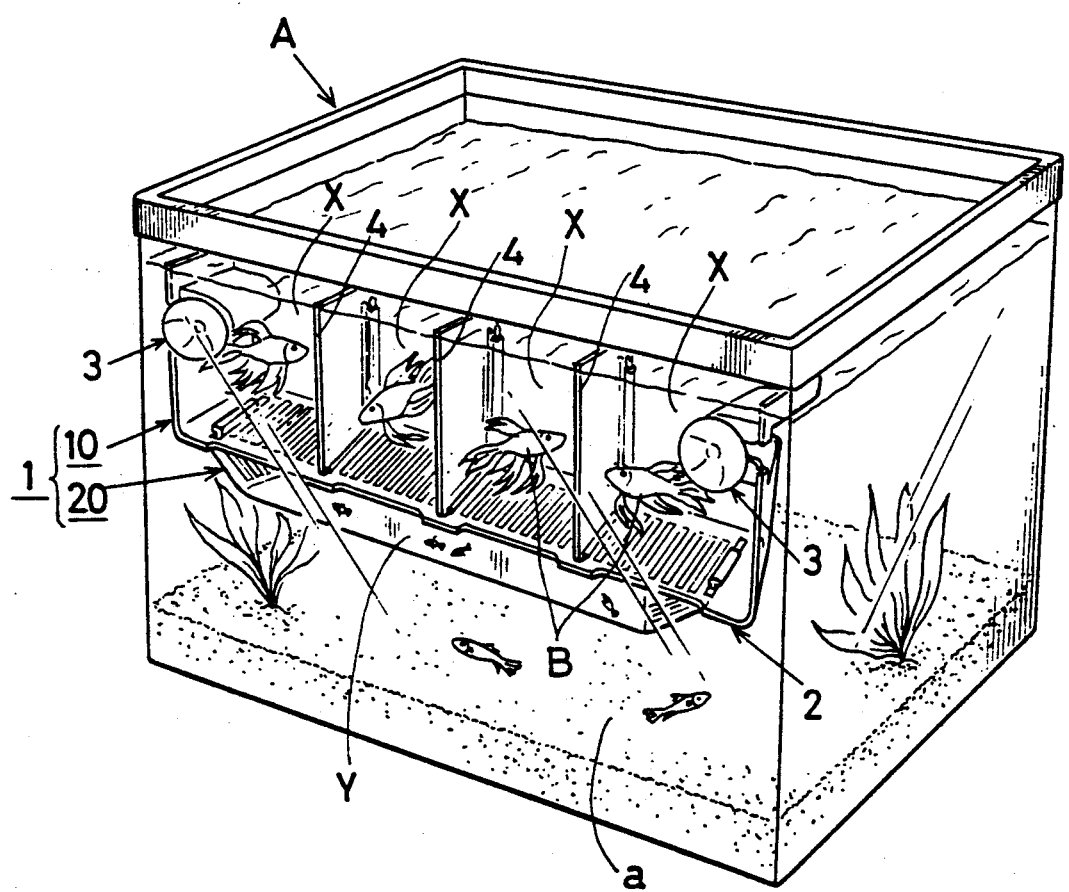
FIG. 1 is a perspective view showing the cell-forming assembly in its entirety, which assembly is installed within a household aquarium.

As shown in FIG. 1, a cell-forming assembly 1 of the invention comprising a first section 10 for separating adult fishes one from another and a second section 20 for fry to be reared is used with a household aquarium "A", the assembly being substantially in contact with the inner surface of an aquarium wall "a".

Figure 2:
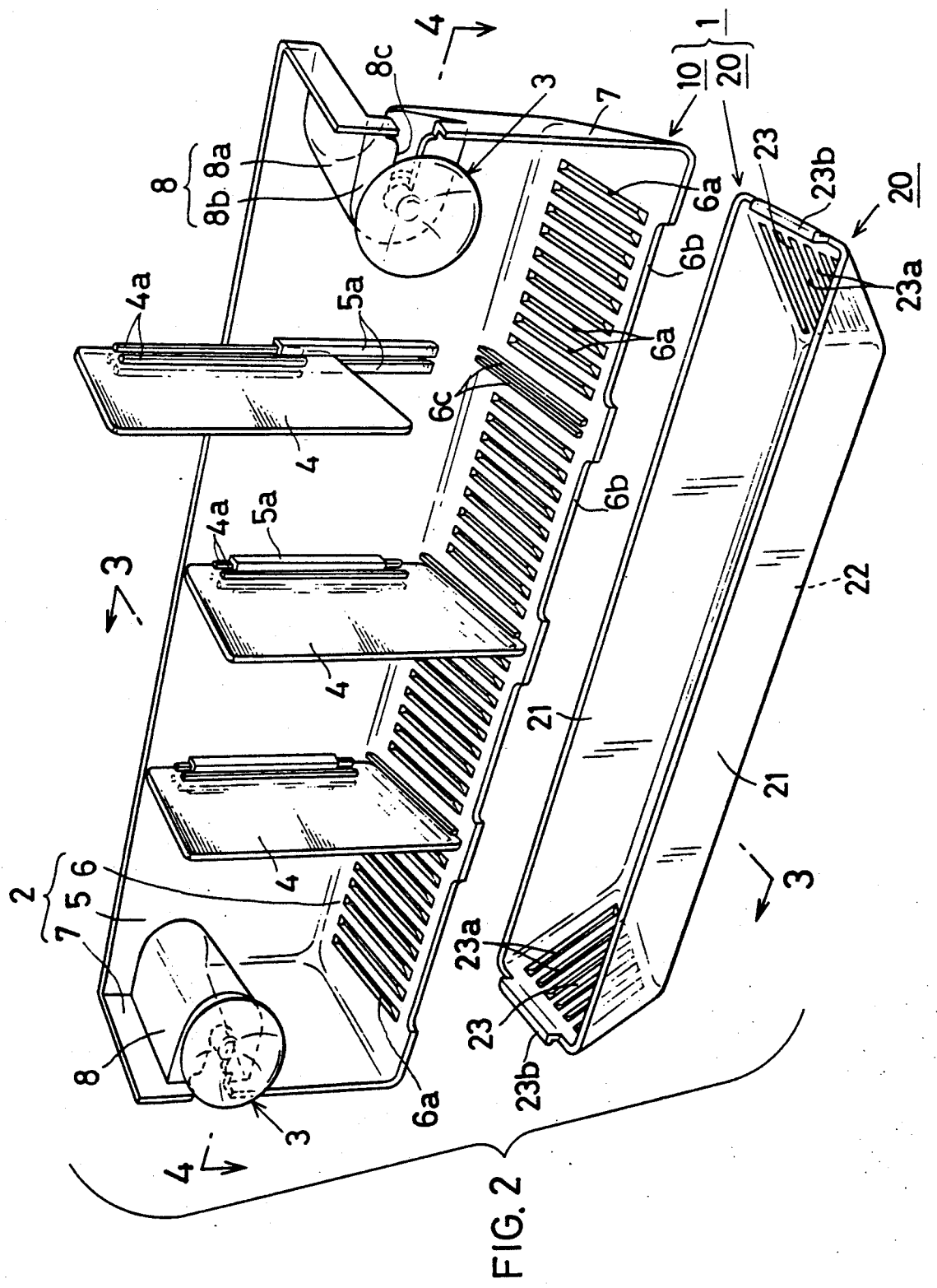
FIG. 2 is another perspective view showing the assembly on an enlarged scale, with one of partitions being pulled upwards, and in such a state that a second section for fry to be reared is detached from a first section for separating adult fishes one from another.

The first section 10 of the assembly comprises, as shown in FIG. 2, a main body 2 having an open top and open front faces. Further, the assembly comprises a pair of fastening members 3 adapted to secure the main body 2 onto the aquarium wall "a", and three partitions 4 dividing the inner space of the main body 2 into separated cells, which cells are arranged from side to side.

The main body 2 is an integral piece molded of a transparent rigid plastics, and is composed of a rectangular back wall 5 elongate sideways, a bottom plate 6 extending forwards and slightly downwards from the lower edge of back wall 5, a pair of opposite side walls 7 each connected to the side edges of back wall 5 and bottom plate 6. The main body 2 thus has the open top and open front faces, and extends long sideways. A preferable example of the plastics is polystyrol resin, but instead the main body may be molded of any other suitable resin such as acrylic resin, polyvinyl chloride resin, polyethylene, polycarbonate resin or the like.

The fastening members 3 which detachably secure the main body 2 to the wall "a" of aquarium "A" are received in main body's fixing portion 8. Each fixing portion 8 is formed at an upper and side extremity of the open front of the main body 2. The fixing portions 8 are each disposed near an upper end of the side wall 7 and comprises a semicylinder 8a merging into the back wall 5 and having its front surface covered with a front plate 8b. A slit 8c extends inwardly from the outer edge of front plate 8b, and comprises at its innermost region a slightly enlarged portion.

Sucking discs are employed as the fastening members 3. Each sucking disc has a base portions 3a fitting in the innermost enlarged portion of the slit 8c. The respective base portions 3a are inserted into the respective slits 3, from the side extremities thereof, so as to keep the fastening members 3 in place.

The main body 2 is removably attached to the wall "a" of the household aquarium "A" as shown in FIG. 1, with the sucking discs 3 being tightly attracted to the inner surface of aquarium wall "a". Thus, the open front face of the body 2 is closed entirely with said inner surface of the aquarium wall "a" which is substantially in contact with the body's open front face. The open top face of the main body 2 need be positioned above the water level in the aquarium "A". In this state, the aquarium wall "a" and the main body 2 cooperate to produce a closed space within the household aquarium Fresh water therein will be caused to always flow through the closed space. In order to prevent the eggs or fry spawned by accommodated adult fishes "B" from being eaten entirely by the fishes "B", the bottom plate 6 comprise slits 6a perforated in parallel with each other, which slits 6a have a width of about 3.2 mm to permit the eggs or fry to drop or move therethrough. It may be possible to substitute a plurality of holes for the slits 6a. Such slits or holes may also be formed through the back wall 5 and/or through side walls 7, in addition to those formed through the bottom plate 6, in order to further improve the circulation of water.

The bottom plate 6 has along its front edge four shallow cutouts 6b extending sideways. Due to those cutouts, slits may be formed between the front edge and the inner surface of the aquarium wall "a" on which the main body is mounted.

Figure 3:
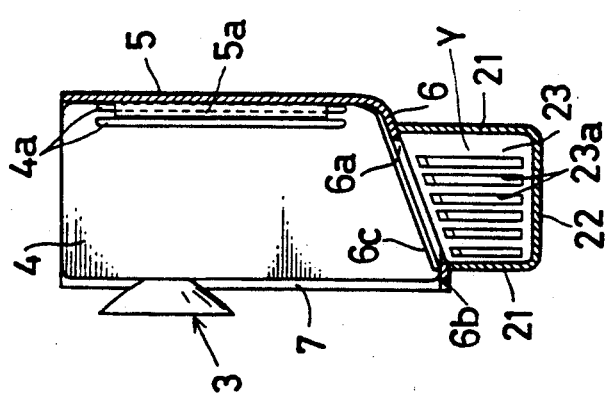
FIG. 3 is a cross section taken along the line 3—3 in FIG. 2.
Figure 4:
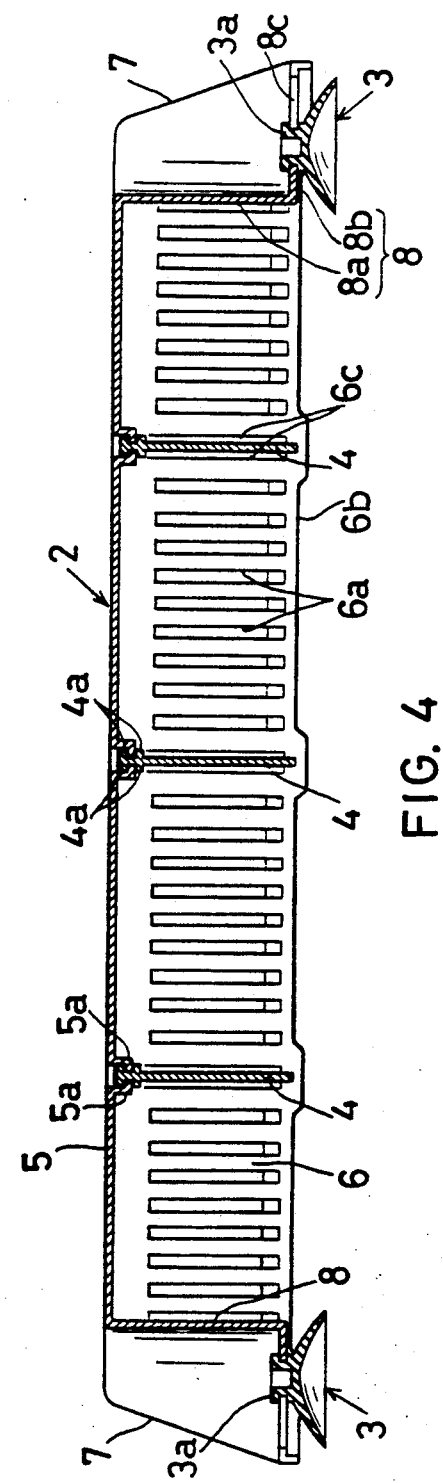
FIG. 4 is also a cross section taken along the line 4—4 in FIG. 2.

The space encircled by the main body 2 and aquarium wall "a" is divided into four cells "X" by three partitions 4, which are removably placed in the main body and arranged at proper intervals in the longitudinal direction of the space. The partitions 4 are of such a shape as corresponding to the cross section of the cells "X", and as is shown in FIGS. 2 and 4, pairs of parallel vertical lugs 4a protrude respectively from the partitions' right and left surface portions adjacent to their rearward vertical edges. A pair of vertical retaining guides 5a are formed on the main body's back wall 5 at their surface portions corresponding to each partition 4, so as to secure it in place as shown in FIGS. 2 to 4. The retaining guides 5a protrude forwards and have forward vertical edges facing one another. Each partition's 4 rearward portion is inserted in between the pair of retaining guides 5a, with its vertically extending lugs 4a being slidably retained thereby. Thus, the main body 2 will keep in place the partitions 4 capable of being withdrawn upwards. In order to stabilize the inserted position of each partition 4, a pair of horizontal lugs 6c are formed on the bottom plate 6.

In use, it is convenient to accommodate fishes one in each cell "X" in a case wherein these fishes are, for example, the fighting fishes which need be separated from other inoffensive fishes bred within the principal space of household aquarium. However, the cells may accommodate also the same fishes as those which are bred in the principal space outside the cells. One or more partitions 4 may be removed to provide a larger cell or cells, if necessary.

In a case wherein the fighting fishes such as called "betta" are accommodated in some cells, each partition 4 need be a plate having a transparency limited to such a degree that the fighting fishes in adjacent cells will not irritate one another. The abovedescribed embodiment regards the aesthetic appearance of aquarium as important so that a blue-colored transparent or translucent plastics sheet is employed to manufacture the partitions. The plastic sheet may be tinted with any color other than blue. It is also possible to employ the frosted glass plates instead of plastics sheet. Further, any opaque plate may be used to render blinded some fishes to the others. That is, the partitions 4 may be made of any material, have any degree of transparency or any thickness insofar as the "betta" fishes "B" in the neighboring cells are prevented from clearly seeing through the partitions and irritating one another.

With such a limited transparency of the partitions 4 of the cells "X" for the neighboring betta fishes "B", the outstretched fins thereof cannot be observed. If however a watcher wants to observe the betta fishes which are quarreling over their territories and frightening one away another, then he need merely remove the partition of limited transparency or substitute an uncolored clear plate therefor. He will be able to see in this way their interesting behavior, namely their outstretched fins.

On the other hand, the second section 20 for forming a further cell to rear the fry is made of a rigid and transparent synthetic resin. The second section 20 is, as shown in FIG. 1, detachably secured to the lower surface of bottom plate 6 of the first section 10 which forms the cells for separation of the adult fishes. As shown in FIG. 2, the second section 20 has an open top face, is long sideways, and comprises a pair of front and back walls 21, a bottom plate 22 connected to the lower ends of said walls 21, and a pair of opposite side walls 23. Each side wall 23 slants upwardly and outwardly of the section 20, and is connected to the side ends of front and back walls 21 and also to the side end of bottom plate 22. Parallel slits 23a of about 2 mm in width are perforated through the side walls 23. The resin of which the section 20 is formed may desirably be for example polystyrol resin, as is in the case of the first section 10. Any other synthetic resin such as acrylic resin, polyvinyl chloride, polyethylene or polycarbonate resin may also be used to manufacture the second section 20.

As shown in FIG. 2, a hook 23b protrude upwards from the upper end of each side wall 23 of the section 20 so as to engage with the corresponding outermost slit 6a perforated through the bottom plate 6 of the first section 10 for separation of adult fishes.

With the hook 23b removably inserted in the outermost slit 6a of the bottom plate 6, the open top face of the second section 20 for rearing the fry will be disposed along the lower surface of said bottom plate 6 so as to be closed therewith, thereby detachably connecting the sections 10 and 20 one to another.

In the thus assembled state, a closed space "Y" will be defined between the second section 20 and the bottom plate 6 of first section 10 which are placed in the household aquarium "A". This space "Y" receives the eggs or fry which may be spawned by the adult fishes within the separated cells "X" and will drop through the slits 6a. These slits 6a are so narrow as to prevent the adult fishes to enter the space "Y". Thus, the eggs or fry are protected from being eaten by the adult fishes.

In summary, the invention provides the cell-forming assembly which can be used with any unmodified conventional or existing aquarium so as to form easily and surely any desired number of cells therein Thus, one and the same household aquarium can accommodate in a safe manner the fighting fishes such as betta separated from other aquarium fishes. The cell-forming assembly of the invention also makes it possible to separate the eggs or fry from adult fishes so that they are reared safely and surely.

What is claimed is:

1. A cell-forming assembly for use in combination with a household aquarium and including a first section for forming cells to separately accommodating adult fishes and a second section for forming another cell to rear such fry as may be spawned by the adult fishes, the first section comprising:

An elongated body having an open top and front faces;

the main body comprising a rectangular back wall, a bottom plate extending forwardly from the lower edge of the back wall and having a plurality of openings, a pair of opposite side walls connected to both side edges of the back wall and bottom plate;

fastening members attached to the main body so as to detachably secure it to an aquarium wall so that the open front face of the main body may be disposed substantially in contact with the inner surface of aquarium wall;

at least one partition detachably to be held inside the main body so that an internal space defined by the main body and aquarium wall is divided into a row of cells arranged from side to side;

the second section for forming a cell to rear the fry being a box-like member having an open top and being elongate from side to side, with the open top being detachably secured to the bottom plate of the main body so as to be in contact therewith;

wherein pairs of vertical retaining guides are formed at given intervals to protrude forwardly and inwardly of the main body's back wall, the vertical retaining guides having forward vertical edges facing one another, and each partition has a pair of parallel vertical lugs which protrude respectively from the partitions' right and left surface portions adjacent to the partition's rearward vertical edge so as to be retained by the retaining guides, whereby the main body detachably keep in place the partitions;

wherein the main body is an integral piece molded of a rigid plastic;

wherein the partitions are of a limited transparency such that the aquarium fishes in the neighboring cells are not likely to irritate one another;

wherein the second section for rearing the fry has at its upper end hooks which are removably engaged with the openings at the ends of the bottom plate constituting the main body of the first section; and said openings permit the eggs or fry to drop or move therethrough; and whereby second section totally encompasses the openings of the bottom plate; and wherein the second section is an integral piece molded of a rigid plastic.

2. A cell-forming assembly according to claim 1, wherein the main body comprises fixing portions which are each formed near an upper end of the side wall and comprises a semicylinder extending inwardly of the side wall to merge into the back wall, having a front surface covered with a front plate, and a slit extending inwardly from the outer edge of front plate, the slit having at its innermost region a slightly enlarged portion, and wherein sucking discs as the fastening members have base portions each fitted in the enlarged portion of the slit.

3. A cell-forming assembly according to claim 1, wherein the partitions are made of a colored transparent plastics sheet.

4. A cell-forming assembly according to claim 1, wherein the partitions are made of a material having a surface ground to be opaque.

* * * * *